UNITED STATES PATENT OFFICE 2,668,832

ETHYLXANTHOYLTHIOXY-N,N,N',N'-TETRAETHYLDIAMINOPHOSPHINE SULFIDE

Henry Tolkmith, Midland, Mich., assignor to The Dow Chemical Company, Midland, Mich., a corporation of Delaware No Drawing. Application April 21, 1953,
Serial No. 350,245

1 Claim. (Cl. 260—455)

This invention is directed to the ethylxanthoylthioxy - N,N,N',N' - tetraethyldiaminophosphine sulfide of the formula

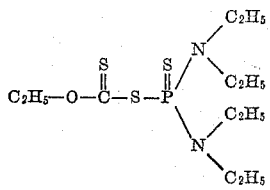

This compound is a viscous oil, somewhat soluble in many organic solvents and substantially insoluble in water. It is of value as an intermediate for the preparation of more complex phosphate derivatives and as a toxic constituent of parasiticide compositions.

The new compound may be prepared by reacting two molecular proportions of diethylamine with one molecular proportion of S-(ethylxanthoyl) dithiophosphoric dichloride of the formula

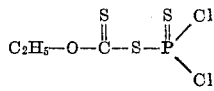

in an inert organic solvent such as benzene or diethyl ether. The reaction is carried out in the presence of a hydrogen chloride acceptor, which conveniently can be an excess of the amine reactant.

In carrying out the reaction, the diethylamine is added portionwise with stirring to the S-(ethylxanthoyl) dithiophosphoric dichloride dispersed in the solvent and the resulting mixture heated for a period of time at a temperature of from 35° to 80° C. to complete the reaction. The reaction takes place at temperatures of from 20° to 80° C. and at a rate which varies directly with the employed temperature. The reaction is somewhat exothermic, temperature being controlled by regulation of the rate of contacting the reactants as well as by the addition and subtraction of heat, if required. Since the desired product has a tendency to decompose at temperatures in excess of 80° C., reaction temperatures substantially in excess of 80° C. for any appreciable period of time should be avoided. Upon completion of the reaction, the mixture may be filtered and the filtrate distilled under reduced pressure at gradually increasing temperatures up to a temperature of 80° C. to separate low boiling constituents and to obtain as a residue the desired ethylxanthoylthioxy-N,N,N',N'-tetraethyldiaminophosphine sulfide.

The S-(ethylxanthoyl) dithiophosphoric dichloride employed as a starting material in the above-described method may be prepared by reacting one molecular proportion of sodium ethylxanthate with at least two molecular proportions of phosphorus thiochloride ($PSCl_3$) in an inert organic solvent such as benzene. In carrying out the reaction, the sodium ethylxanthate and phosphorus thiochloride are mixed together and the resulting dispersion heated for a period of time at a temperature of from 40° to 80° C. To avoid decomposition, temperatures substantially in excess of 80° C. for any appreciable period of time should not be employed. Upon completion of the reaction, the mixture may be filtered and the filtrate concentrated by distillation at reduced pressure to a temperature up to 80° C. to remove low boilers such as unreacted phosphorus thiochloride and reaction solvent. The desired S-(ethylxanthoyl) dithiophosphoric dichloride is thereby obtained as a residue. The latter compound is a viscous oil having a density of 1.451 at 21° C. This compound and described method for its preparation constitute the subject matter of my copending application Serial No. 203,768.

In a representative preparation, 26.3 grams (0.36 mole) of diethylamine was added portionwise with stirring and cooling to 21.8 grams (0.085 mole) of S-(ethylxanthoyl) dithiophosphoric dichloride dispersed in 600 milliliters of diethyl ether and the resulting mixture heated for 4 hours at the boiling temperature and under reflux to complete the reaction. The mixture was then filtered and the filtrate concentrated at distillation at gradually increasing temperatures up to a temperature of 80° C. to obtain as a residue an ethylxanthoylthioxy-N,N,-N',N'-tetraethyldiaminophosphine sulfide product. The latter is a viscous oil having a density of 1.1625 at 20° C.

The new ethylxanthoylthioxy-N,N,N',N'-tetraethyldiaminophosphine sulfide product is effective as a parasiticide and adapted to be employed for the control of a wide range of agricultural and household pests such as flies, mites, aphids, beetles and cockroaches and Southern army worms. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixtures. In representative operations against two-spotted spider mites and Southern army worms, 100 percent kills of these organisms were obtained with aqueous spray compositions containing 1.5 pounds of the toxic phosphine sulfide per 100 gallons of spray mixture.

This is a continuation in part of my copending application Serial No. 203,778, filed December 30, 1950.

I claim:

Ethylxanthoylthioxy-N,N,N',N' - tetraethyldiaminophosphine sulfide.

HENRY TOLKMITH.

No references cited.